US010415714B1

(12) United States Patent
Kennedy

(10) Patent No.: US 10,415,714 B1
(45) Date of Patent: Sep. 17, 2019

(54) FIRE HYDRANT

(71) Applicant: Kennedy Valve Company, Elmira, NY (US)

(72) Inventor: Paul Kennedy, Horseheads, NY (US)

(73) Assignee: Kennedy Valve Company, Elmira, NY (US)

( * ) Notice: Subject to any disclaimer, the term of this patent is extended or adjusted under 35 U.S.C. 154(b) by 1 day.

(21) Appl. No.: 15/934,005

(22) Filed: Mar. 23, 2018

(51) Int. Cl.
*E03B 9/02* (2006.01)
*F16K 27/00* (2006.01)
*A62C 35/20* (2006.01)

(52) U.S. Cl.
CPC ............ *F16K 27/006* (2013.01); *A62C 35/20* (2013.01); *E03B 9/02* (2013.01)

(58) Field of Classification Search
CPC ......... F16K 27/006; A62C 35/20; E03B 9/02; E03B 9/04; E03B 9/06
See application file for complete search history.

(56) References Cited

U.S. PATENT DOCUMENTS

| | | | | |
|---|---|---|---|---|
| 726,369 A | * | 4/1903 | Sullivan | E03B 9/04 137/272 |
| 3,961,642 A | * | 6/1976 | Thomas | E03B 9/04 137/272 |
| 4,790,342 A | * | 12/1988 | Segal | E03B 9/02 137/15.02 |
| 5,121,772 A | * | 6/1992 | Bouc | E03B 9/02 137/272 |
| 5,201,338 A | * | 4/1993 | McKeague | E03B 7/14 134/166 C |
| 5,588,460 A | * | 12/1996 | Meneses | E03B 9/06 137/296 |
| 2004/0154659 A1 | * | 8/2004 | Lafalce | E03B 9/16 137/218 |

* cited by examiner

*Primary Examiner* — Reinaldo Sanchez-Medina
(74) *Attorney, Agent, or Firm* — Brown & Michaels, PC

(57) ABSTRACT

A fire hydrant includes an upper barrel, which further includes a body and at least one outlet. The body has a longitude, a longitudinal axis, a first portion, and a second portion, the first portion forming a first length of the longitude, the second portion forming a second length of the longitude, the first portion coupled to the second portion, the body having at least one wall defining an internal cavity. The first portion has a first dimension spanning the cavity perpendicular to the longitudinal axis between opposing points on the at least one wall. The second portion has a second dimension spanning the cavity perpendicular to the longitudinal axis between opposing points on the at least one wall. The first dimension is greater than the second dimension.

21 Claims, 2 Drawing Sheets

FIRE HYDRANT

BACKGROUND OF THE INVENTION

Field of the Invention

The invention pertains to the field of fire hydrants. More particularly, the invention pertains to an upper barrel of a fire hydrant.

Description of Related Art

In most locales, fire hydrants require annual inspections and maintenance. Even when not required, fire hydrants sometimes require maintenance. Maintenance and inspections often require some disassembly of a fire hydrant, such as disconnection of an upper barrel from a lower barrel of a dry fire hydrant, a bonnet from the upper barrel, or a head from a spool of a wet fire hydrant, followed by maneuvering of the heavy components.

Fire hydrants can be very heavy for a normal human to manipulate. Depending on the designated capacity of the fire hydrant, most fire hydrants can weigh roughly between 350 and 800 pounds. One person cannot normally manipulate a fire hydrant well, if at all, and multiple people and/or the aid of machinery is usually necessary. Further, the Occupational Safety and Health Administration (OSHA) can impose fines on employers who require dangerous lifts. After World War II, the Bureau of Labor Standards of the U.S. Department of Labor published "Bulletin No. 11—A Guide to the Prevention of Weight Lifting Injuries", which recommended a maximum lifting weight of 50 lbs. for men. Today, the National Institute for Occupational Safety and Health (NIOSH) publishes safe lifting guidelines with an algorithm to define a safe lift, and many workplaces simply restrict unassisted lifts to 50 pounds (22.68 kg). Many fire hydrants are designed with more parts than necessary, to decrease the weight per part, for example, to be under this 50 pound limit. These extra parts and joints render maintenance more complex, more expensive, and more time-consuming.

SUMMARY OF THE INVENTION

A fire hydrant is disclosed herein that has an upper barrel with a novel shape to achieve a weight under 50 pounds, reduce the time and complexity of maintenance, and decrease turbulence of laminar water flow at an outlet during use of the hydrant. In one embodiment, a fire hydrant includes an upper barrel, which further includes a body and at least one outlet. The body has a longitude, a longitudinal axis, a first portion, and a second portion. The first portion forms a first length of the longitude, the second portion forms a second length of the longitude, the first portion is coupled to the second portion, and the body has at least one wall defining an internal cavity. The at least one outlet is fluidly connected to the internal cavity of the body at a position where the first portion is coupled to the second portion. The first portion has a first dimension spanning the cavity perpendicular to the longitudinal axis between opposing points on the at least one wall. The second portion has a second dimension spanning the cavity perpendicular to the longitudinal axis between opposing points on the at least one wall. The first dimension is greater than the second dimension.

In another embodiment, a fire hydrant includes an upper barrel, which further includes a body and at least one outlet. The body has a longitude, a longitudinal axis, a first portion, and a second portion. The first portion forms a first length of the longitude, the second portion forms a second length of the longitude, the first portion is coupled to the second portion, and the body has at least one wall defining an internal cavity. The at least one outlet is fluidly connected to the internal cavity of the body at a position where the first portion is coupled to the second portion. The second portion includes a first end at the at least one outlet and a second end distal from the first end, the second end having a step radially outward and a larger perimeter than the majority of the second portion, the step being a stop surface against which a flange on an operating stem nut can abut to limit movement of the operating stem nut into the second portion.

DETAILED DESCRIPTION OF THE INVENTION

Figure 1:
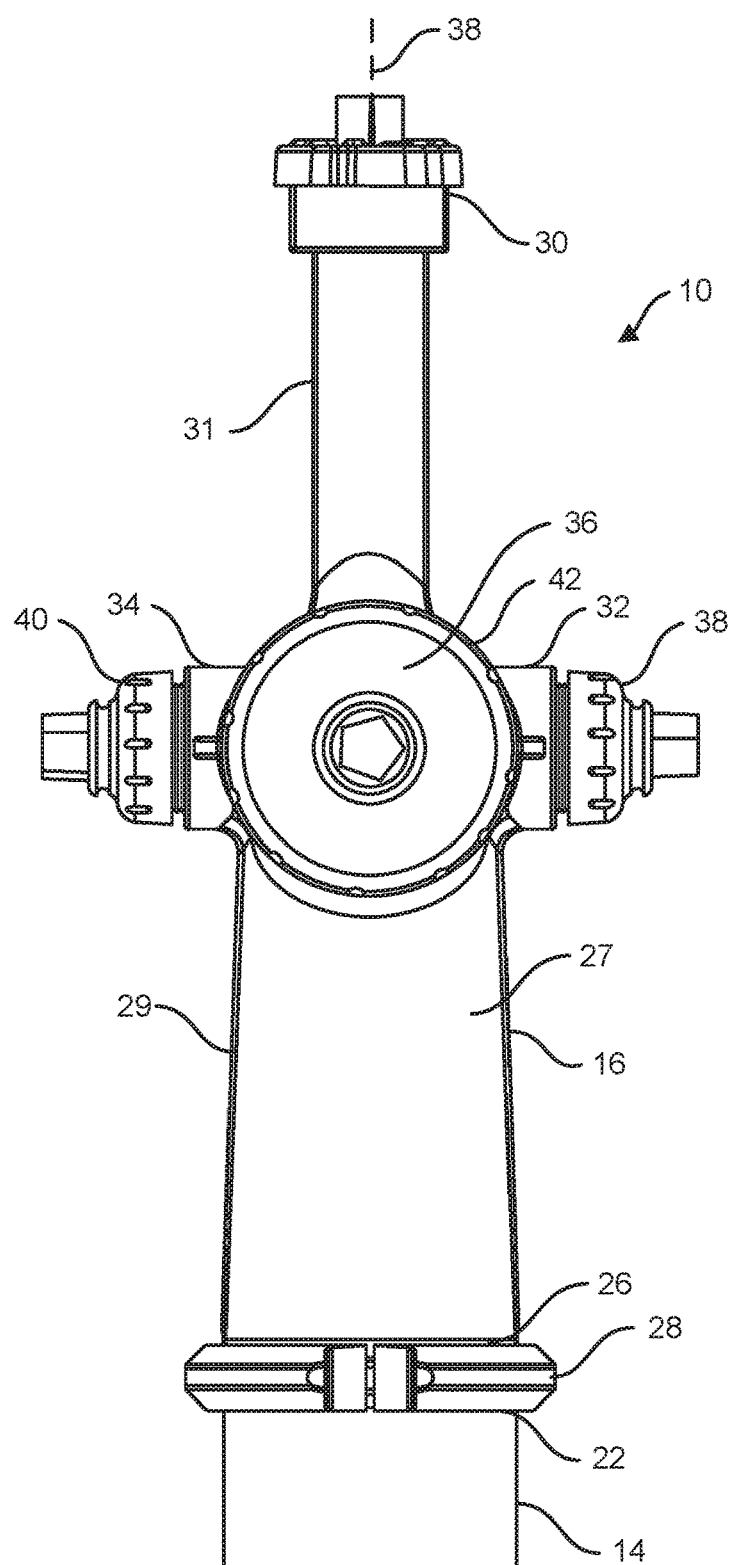
FIG. 1 shows a front view of a fire hydrant, according to an embodiment of the invention.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Certain aspects of fire hydrants are regulated by standards in order to assure consistent access and use by fire safety professionals. For example, fire hydrant color can be regulated to assure that fire safety professionals can quickly determine the pressure and flow capacity of any particular fire hydrant. For another example, outlets and outlet caps of a fire hydrant are regulated so fire hydrants can be accessed for use with known equipment and so fire hoses can connect consistently with all fire hydrants in a municipality. These standards limit the ability to modify fire hydrant design to reduce fire hydrant weight.

Figure 2:
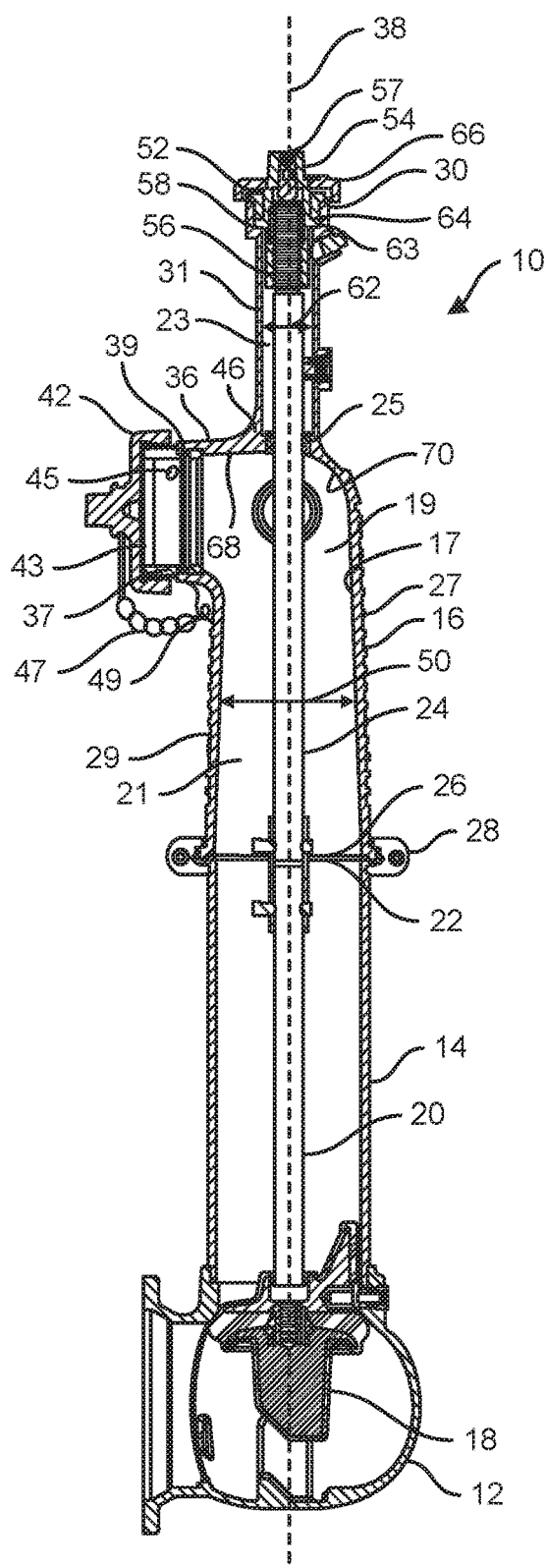
FIG. 2 shows a cross-sectional view of the fire hydrant illustrated in FIG. 1.

FIGS. 1 and 2 illustrate a fire hydrant 10 improved in shape and weight, to facilitate easier, safer, and less expensive manual handling, while maintaining important design standards. Despite being built to meet certain regulated standards, fire hydrants exist in large variety, such as wet barrels and dry barrels, ranges in capacity, ranges in size, and other variations. While the fire hydrant 10 is illustrated as a dry barrel fire hydrant, it should be noted that the features to lessen the weight of the fire hydrant 10 can be adapted to wet barrel fire hydrants and/or various other fire hydrants to make these fire hydrants lighter in weight and easier to manipulate as well.

The fire hydrant 10 includes a base 12, a lower barrel 14, and an upper barrel 16. These three components can be among the heaviest components of a fire hydrant. The base 12 and the lower barrel 14, which can be manufactured as an integrated, single piece or coupled by some form of fastener(s), can be installed below ground. The base 12 can couple with water supply piping (not shown), such as piping in a municipal water-supply system. As an elbow, the base 12 can redirect water from a horizontally laid water-supply pipe into the vertically oriented lower barrel 14. The upper barrel 16 can be installed to a water supply system above ground, mounted to the lower barrel 12.

The fire hydrant 10, being a dry barrel fire hydrant, has a main valve 18 located in the base, which seals water out of the fire hydrant underground (e.g., below the frost line) when not in use, to prevent water from freezing inside the fire hydrant in climates that experience freezing temperatures above ground. The main valve 18 is coupled to a lower stem 20, which can be actuated by an operator (e.g., a fireperson or maintenance person) to open and close the main valve 18, as described further herein below.

The lower barrel 14 is generally cylindrically shaped, and the lower barrel houses the lower stem 20, which extends longitudinally through the center of the lower barrel 14. At an end 22 of the lower barrel 14, where the lower barrel 14 couples with the upper barrel 16, the lower stem 20 also couples with an upper stem 24.

The upper barrel 16 can be coupled with the lower barrel 14 at a first end 26 of the upper barrel 16. This coupling can be fastened with a breaking clamp 28, which facilitates disengagement of the upper barrel 16 and upper stem 24 from the lower barrel 14 and the lower stem 20 in the case of impact, such as might be caused by a vehicle. The coupling of the upper barrel 16 to the lower barrel 14 can be accomplished with just two bolts, thereby easing the time and complexity to remove the upper barrel 16 from the lower barrel 14. From the first end 26 of the upper barrel 16, the upper stem 24 extends longitudinally through the center of the upper barrel 16 to a second end 30 of the upper barrel 16.

The upper barrel 16 can have a body 27 with at least one side wall 17 and a top wall 68 that defines an internal cavity 19 through which water (or another fluid) can flow. The body 27 includes a lower portion 29, which is generally cylindrical in shape, or slightly conical with a tapering diameter. The tapering diameter requires less material than the cylindrically shaped lower portion, and has less weight. The overall weight of the upper barrel 16 can be less than 50 pounds. The lower portion 29 defines a main cavity 21.

Between the first end 26 and the second end 30 of the upper barrel 16, delineating the lower portion 29 from an upper portion 31 of the body 27, and fluidly connected directly to the main cavity 21, is at least one outlet extending from the body 27, to allow water to flow out of the fire hydrant 10. A fire hose (not shown) can be connected to the fire hydrant 10 at the at least one outlet using a fire hose connector (not shown). Any now-known or future-developed fire hose connector can be used, and the outlet can be adapted for use with any now-known or future-developed fire hose and fire hose connector. While any now-known or future-developed number and/or sized outlet can be implemented, fire hydrant 10 is illustrated with a first outlet 32, a second outlet 34, and a third outlet 36. All three outlets 32, 34, 36 extend approximately perpendicular to a longitudinal, center axis 38 of the upper barrel 16, such that water flowing vertically upward through the upper barrel 16 would be redirected approximately 90 degrees to a horizontal direction away from the longitudinal, center axis 38 in order to exit the upper barrel 16. The redirection of water is facilitated by a rounded transition between the side wall 17 and the top wall 68 of the main cavity 21. As opposed to prior fire hydrants, in which the outlets form a T junction with the upper barrel 16, and in which the main cavity extends beyond (above, in an installed, upright orientation) the outlet, the outlets 32, 34, 36 of fire hydrant 10 form an L junction with the upper barrel 16, and the main cavity 21 of the fire hydrant 10 ends at the upper boundary of the outlets 32, 34, 36. In other words, the main cavity merges or transitions into the nozzle, to create a continuous flow path that turns 90 degrees into the outlets 32, 34, 36. This flow path reduces turbulence as compared to prior fire hydrants.

The first and second outlets 32, 34 are of an equal size, (i.e., equal diameter) which is smaller than the third outlet 36. The first and second outlets 32, 34 are positioned oppositely around the circumference of the fire hydrant 10, such that the first and second outlets 32, 34 would let out water in opposite directions (i.e., away from each other and from the center, longitudinal axis of the fire hydrant 10). The third outlet 36 is positioned between the first and second outlets 32, 34, equidistant from the first and second outlets 32, 34. All three outlets 32, 34, 36 can have a center axis in a plane perpendicular to the longitudinal, center axis 38 of the upper barrel 16. The first, second, and third outlets 32, 34, 36 are sealed with a first cap 38, a second cap 40, and a third cap 42, respectively.

The outlet 36 can include a nozzle 37, an o-ring 39, the cap 42, a nozzle cap gasket 43, and a nozzle retaining screw 45. The hydrant 10 can include, at the outlet 36, a nozzle cap chain 47 and a nozzle chain hook 49, for example an S-hook, which connects one end of the nozzle cap chain 47 to the body 27 of the fire hydrant 10. Each other nozzle 32, 34 can have similar components appropriately sized.

Extending from the first outlet 32, the second outlet 34, and the third outlet 36 to the second end 30 of the upper barrel 16, is the upper portion 31 of the upper barrel 16. The upper portion 31 defines a secondary cavity 23, which is part of the internal cavity 19, but delineated from the main cavity 21 by the top wall 68 of the main cavity. An opening between the secondary cavity 23 and the main cavity 21 allows the upper stem 24 to pass through, but a seal 25 can be positioned between the main cavity 21 and the secondary cavity 23, at the joint between the lower portion 29 and the upper portion 31, to seal between the top wall 68 and the upper stem 24.

The upper portion 31 has a generally cylindrical shape and a reduced diameter relative to the lower portion 29 and relative to conventional fire hydrants. Looking at outlet 36 for example, the upper portion 31 extends to the second end 30, more specifically, from an intersection 46 of the body 27 and the third outlet 36 closest to the second end 30. For structural support of the intersection point 46, or for cosmetics, or otherwise, the intersection between the upper portion 31 of the body 27 and the third outlet 36 can be rounded. Similarly, the body 27 can be reduced in radius at similar points where the first outlet 32 and the second outlet 34 extend from the body, and the reduction can be tapered to create a rounded joint, again for added structural integrity, cosmetic purposes, or otherwise. It should be noted that while the upper portion 31 has a reduced diameter relative to the lower portion 29, if the hydrant were not cylindrical, but another shape that is not appropriately described as having a diameter, then the similar dimension for the shape would still be reduced. For example, if the fire hydrant 10 had an octagonal or a square cross section rather than a circular cross section, then a straight line drawn across the extent between opposing sides of the octagon or square would be reduced in the upper portion relative to the lower portion. In other words, the lower portion 29 of the body 27 can have a first dimension 60 spanning the main cavity 21 perpendicular to the longitudinal axis 38 between opposing points on the at least one side wall 17, the upper portion 31 can have a second dimension 62 spanning the secondary cavity 23 perpendicular to the longitudinal axis 38 between opposing points on the at least one side wall 17, and a value of the first dimension 60 can be greater than a value of the second dimension 62. In some embodiments, a value of the second dimension 62 can be less than 75% of a value of the first dimension 60. In some embodiments, a value of the second dimension 62 can be less than 50% of a value of the first dimension 60. In some embodiments, a value of the second dimension 62 can be less than 25% of a value of the first dimension 60.

The upper portion 31, being reduced in diameter, has significantly less material than equivalent portions of prior art fire hydrants. Because fire hydrants are made of heavy metal, the significant material reduction equates to significant weight reduction of the upper barrel 16. Further, in part because of the weight reduction facilitated by the lighter upper portion 31, the upper barrel has less need to split weight among multiple parts that can be connected to form the upper barrel. For example, no bonnet is necessary, which makes access of the stem and disassembly for maintenance quicker and easier.

At the second end 30 of the upper barrel 16, the fire hydrant 10 includes an operating stem nut 54 to actuate the upper and lower stem 24, 20 and thereby open and close the main valve 18. An end 56 of the upper stem 24 is threaded, and the operating stem nut 54 is correspondingly threaded, such that the operating stem nut 54 can be screwingly engaged with the end 56 of the upper stem 24 and inserted, at least partially, into the second end 30 of the upper barrel 16. A grease fitting 57 can be recessed into the operating stem nut 54 in order to provide for access to lubricate the threads on the end 56 and on the operating stem nut 54. The second end 30 of the upper barrel 16 steps to a larger diameter than other portions of the upper portion 31 of the body 27 of the upper barrel 16, creating a step or a stop surface 58 against which a flange 63 on the operating stem nut 54 can abut to limit movement of the operating stem nut 54 into the upper portion 31. The second end 30 with a larger diameter than other portions of the upper portion 31 can be a minority of the upper portion 31. The lesser the longitudinal length is of the second end 30, the lesser is the material and weight of the fire hydrant 10.

A lock nut 52 can be secured over the flange 63 to limit movement of the operating stem nut 54 out of the upper portion 31. For example, the second end 30 can be internally threaded, and the lock nut 52 can be externally threaded such that the lock nut 52 can be threaded into the second end 30, to lock the flange 63 between the stop surface 58 and the lock nut 52. The operating stem nut 54, as a result, can be rotated without movement along the longitudinal, center axis 38 of the fire hydrant 10, and can, via threaded engagement with the upper stem 24, move the upper stem 24 along the longitudinal, center axis 38 to open or close the main valve 18. A thrust washer 64 can be positioned between the flange 63 and the lock nut 52 to act as an antifriction bearing to reduce operating torque of the operating stem nut 54. A cap 66 can cover the lock nut 52, to deflect moisture and dust.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:
1. A fire hydrant comprising:
an upper barrel including:
an outer perimeter; and
a body, the body having a longitude, a longitudinal axis, a first portion, and a second portion, the first portion forming a first length of the longitude, the second portion forming a second length of the longitude, the first portion coupled to the second portion, the first portion and the second portion each including at least a portion of the outer perimeter of the upper barrel, the body having at least one wall defining an internal cavity; and
at least one outlet, the at least one outlet fluidly connected to the internal cavity of the body at a position where the first portion is coupled to the second portion,
the first portion having a first dimension spanning the cavity perpendicular to the longitudinal axis between opposing points on the at least one wall,
the second portion having a second dimension spanning the cavity perpendicular to the longitudinal axis between opposing points on the at least one wall,
the first dimension being greater than the second dimension.

2. The fire hydrant of claim 1, wherein the first portion tapers toward the at least one outlet such that the first portion is conical.

3. The fire hydrant of claim 1, wherein the second portion comprises an end distal from the at least one outlet, the end having an internal step, the internal step including a stop surface to limit insertion of an operating stem nut.

4. The fire hydrant of claim 1, wherein the second portion comprises a distal end distal from the at least one outlet and a proximal end proximal to the at least one outlet, and the second dimension at the distal end is greater than the second dimension at a median point between the distal end and the proximal end.

5. The fire hydrant of claim 1, wherein a value of the second dimension is less than 75% of a value of the first dimension.

6. The fire hydrant of claim 1, wherein a value of the second dimension is less than half of a value of the first dimension.

7. The fire hydrant of claim 1, wherein the internal cavity includes a main cavity defined by the first portion of the body and a secondary cavity defined by the second portion of the body, wherein the at least one outlet has a standard firehose connector and is fluidly connected directly to the main cavity, and wherein the fire hydrant further includes a stem and a seal, the stem extending through the upper barrel and the seal being positioned between the main cavity, the secondary cavity, and the stem to seal the secondary cavity from the main cavity.

8. The fire hydrant of claim 1, wherein the second portion extends from the first portion in the shape of a cylinder.

9. The fire hydrant of claim 1, wherein the weight of the upper barrel is less than 50 pounds.

10. The fire hydrant of claim 1, wherein the first portion of the upper barrel defines a main cavity and has a side wall with a rounded transition to a top wall to direct water traveling from the first portion toward the second portion out the at least one outlet, wherein the second portion of the upper barrel has a secondary cavity, and wherein the top wall delineates the main cavity from the secondary cavity.

11. The fire hydrant of claim 1, further comprising:
a base; and
a lower barrel fluidly connected to the base,
the upper barrel fluidly connected to the lower barrel,
the lower barrel and the upper barrel aligned longitudinally around a center, longitudinal axis.

12. The fire hydrant of claim 1, wherein the at least one outlet has an uppermost interior point farthest toward the second portion in a direction parallel to the longitudinal axis, wherein the at least one outlet forms an L junction with the first portion, and wherein the internal cavity ends no closer to the second portion in another direction parallel to the longitudinal axis than the uppermost interior point.

13. A fire hydrant comprising:
an upper barrel including:
a body, the body having a longitude, a longitudinal axis, a first portion, and a second portion, the first portion forming a first length of the longitude, the second portion forming a second length of the longitude, the first portion coupled to the second portion, the body having at least one wall defining an internal cavity; and
at least one outlet, the at least one outlet fluidly connected to the internal cavity of the body at a position where the first portion is coupled to the second portion,
the second portion including a first end at the at least one outlet and a second end distal from the first end, the second end having a step radially outward and a larger perimeter than the majority of the second portion, the step including a stop surface against which a flange on an operating stem nut can abut to limit movement of the operating stem nut into the second portion.

14. The fire hydrant of claim 13, wherein the first portion has a first dimension spanning the cavity perpendicular to the longitudinal axis between opposing points on the at least one wall, the second portion has a second dimension spanning the cavity perpendicular to the longitudinal axis between opposing points on the at least one wall, and the first dimension is greater than the second dimension.

15. The fire hydrant of claim 14, wherein a value of the second dimension is less than 75% of a value of the first dimension.

16. The fire hydrant of claim 14, wherein a value of the second dimension is less than half of a value of the first dimension.

17. The fire hydrant of claim 13, wherein the lower portion tapers toward the at least one outlet such that the lower portion is conical.

18. The fire hydrant of claim 13, wherein the internal cavity includes a main cavity defined by the first portion of the body and a secondary cavity defined by the second portion of the body, and wherein the fire hydrant further includes a stem and a seal, the stem extending through the upper barrel and the seal being positioned between the main cavity, the secondary cavity, and the stem to seal the secondary cavity from the main cavity.

19. A fire hydrant of claim 18, wherein the at least one outlet has a standard firehose connector and is fluidly connected directly to the main cavity.

20. The fire hydrant of claim 13, wherein the weight of the upper barrel is less than 50 pounds.

21. The fire hydrant of claim 13, wherein the first portion of the upper barrel defines a main cavity and has a side wall with a rounded transition to a top wall to direct water traveling from the first portion toward the second portion out the at least one outlet, wherein the second portion of the upper barrel has a secondary cavity, and wherein the top wall delineates the main cavity from the secondary cavity.

* * * * *